Oct. 22, 1963            L. BERG            3,107,707

POWER-OPERATED SCREW-DRIVER AND PARTS ASSEMBLY MACHINE

Filed Dec. 1, 1960            4 Sheets-Sheet 1

INVENTOR.
LOUIS BERG
BY Allen M. Kross
ATTY.

Oct. 22, 1963

L. BERG 3,107,707

POWER-OPERATED SCREW-DRIVER AND PARTS ASSEMBLY MACHINE

Filed Dec. 1, 1960

INVENTOR.
LOUIS BERG
BY Allen M Krass
ATTY.

Oct. 22, 1963  L. BERG  3,107,707
POWER-OPERATED SCREW-DRIVER AND PARTS ASSEMBLY MACHINE
Filed Dec. 1, 1960  4 Sheets-Sheet 3

INVENTOR.
LOUIS BERG
BY Allen M Kraus
ATTY.

Oct. 22, 1963   L. BERG   3,107,707
POWER-OPERATED SCREW-DRIVER AND PARTS ASSEMBLY MACHINE
Filed Dec. 1, 1960   4 Sheets-Sheet 4
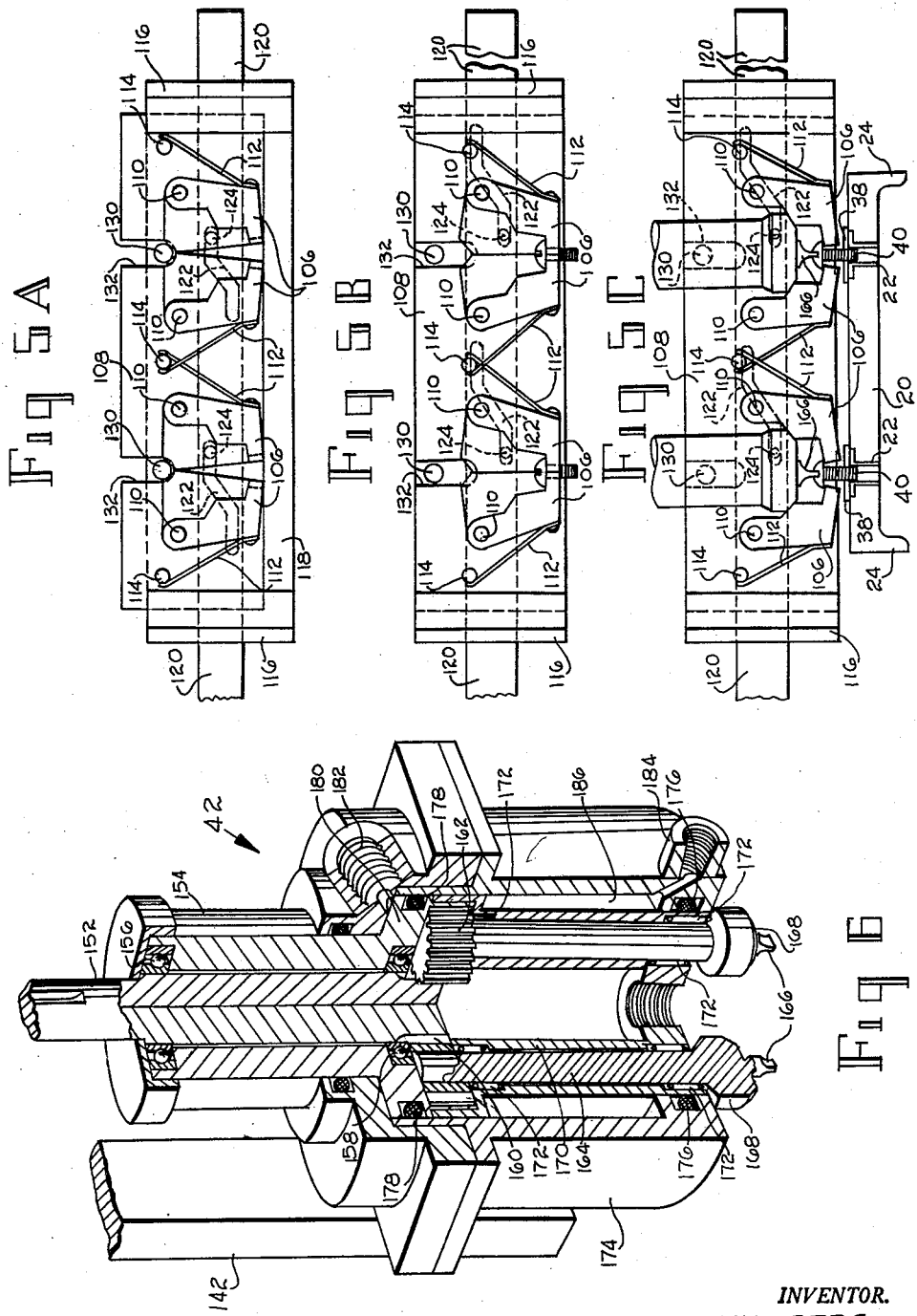
INVENTOR.
LOUIS BERG

# United States Patent Office 3,107,707
Patented Oct. 22, 1963

3,107,707
POWER-OPERATED SCREW-DRIVER AND
PARTS ASSEMBLY MACHINE
Louis Berg, 3254 Kilmer, Troy, Mich.
Filed Dec. 1, 1960, Ser. No. 72,946
4 Claims. (Cl. 144—32)

This invention relates to a machine for automatically assembling parts which require threaded fasteners. It broadly comprises a device which receives parts having threaded female holes, screws adapted to fit such holes and washers, and automatically inserts a screw and washer into each hole. The concept of the present invention may also be employed in machines which secure parts other than washers between a screw and a female threaded member.

Machines for automatically performing the above operations are well known, and the present invention provides a machine which surpasses previously known machines in the following respects, among others. First, the present machine is designed to insert threaded fasteners at an extremely high rate. It accomplishes this object by utilizing a single powering mechanism to insert four screws simultaneously. In doing so, it obviates the space and other structural difficulties which are inherent in such an operation. Additionally, the machines made in accordance with the present invention surpass the prior art in the simplicity of their construction assuring low initial cost and easy maintenance.

A preferred embodiment of the present invention, which will be subsequently described in detail, is adapted to insert four screws and their attendant washers into a single electrical terminal block simultaneously. Broadly, the machine which constitutes the preferred embodiment employs a feed hopper supplying a continuous line of oriented terminal blocks to a shuttle feed device which periodically indexes the line of blocks linearly so as to push a new block into the work area and simultaneously push a completed block out of the work area. Two vibratory hoppers which feed oriented screws to the work area are disposed one on either side of the shuttle path of the terminal blocks as are a pair of vibratory hoppers which feed washers into the work area. The screw driving mechanism comprises a four-spindle head which is disposed above the work area and adapted for vertical movement into and out of the area. Four washer feed devices powered by a pair of hydraulic cylinders provide washers in the space immediately above each hole in the terminal block. Similarly, a screw feed device powered by another hydraulic cylinder allows one screw to be fed from the vibratory hoppers to each of four screw retaining mechanisms. These mechanisms, which are powered by another hydraulic cylinder, grasp the screws and move them down into position over the holes in the terminal block. The screw driver spindle then descends and rotates the screws into the terminal block. A shoulder on the screw driver acts to release the screws from their holders. The screw driver head then rises and the shuttle moves a new terminal block into position and passes the old one out. All of the hydraulic cylinders operate in time relationship to one another under the control of an electric hydraulic system of the normal type.

It is, therefore, seen to be an object of the present invention to provide a machine which is capable of inserting a plurality of threaded fasteners into a workpiece quickly and efficiently.

Another object is to provide such a machine which is adapted to operate on workpieces having threaded fasteners in close physical relationship to one another and to provide such a machine which is simple in construction so as to be economical and dependable in operation.

Other objects, advantages, and applications of the present invention will be made obvious by the following detailed description of a preferred embodiment of the invention. The description makes reference to the accompanying drawings in which.

FIGURES 5A, 5B, and 5C are sectional elevation views illustrating three conditions of the screw feeding mechanism;

FIGURE 6 is a perspective sectional view of the screw driver spindle mechanism; and FIGURE 7 is a perspective view of the terminal block operated on by the machine with one screw and washer inserted.

Figure 1:
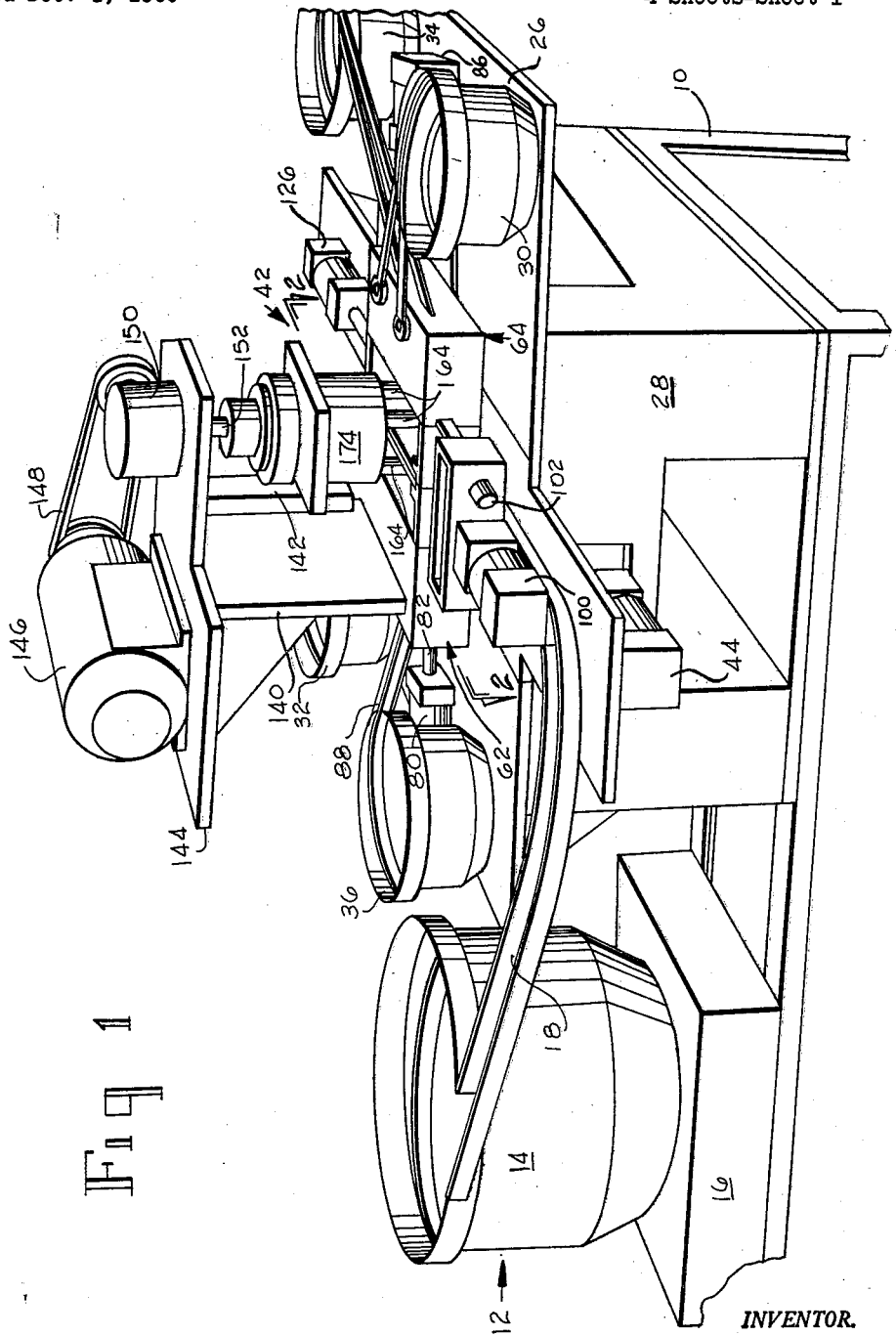
FIGURE 1 represents a perspective view of the present machine.
Figure 1:
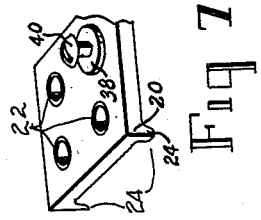
Figure 2:
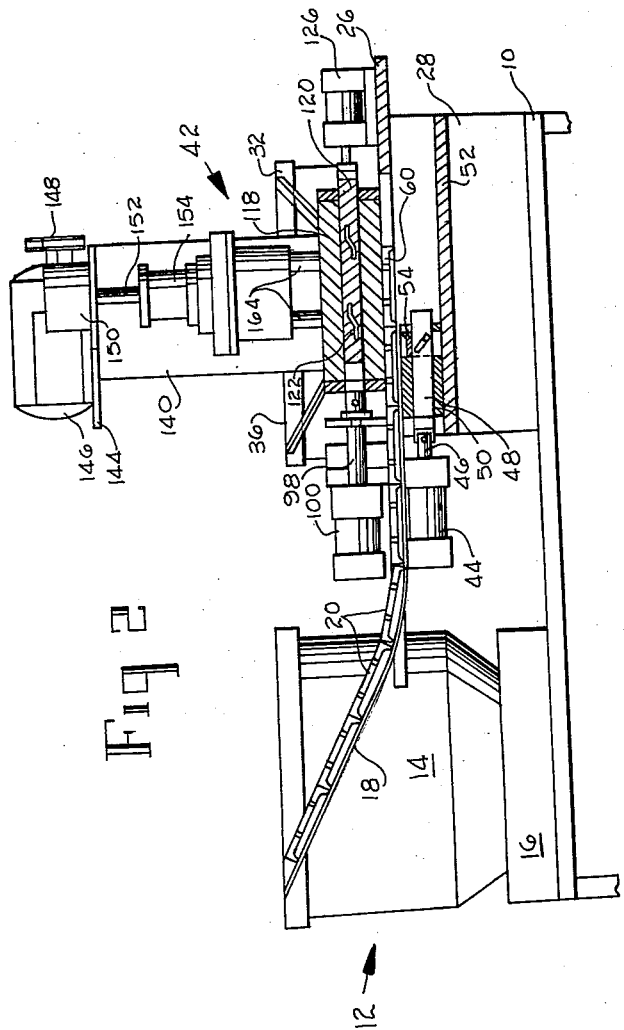
FIGURE 2 represents an elevation view of the machine partially sectioned along the lines 2—2 of FIGURE 1.

As may best be seen in FIGURES 1 and 2, the machine is supported above the floor on a rectangular table 10. A vibratory feed hopper, generally indicated at 12, is supported at one corner of the table. This feed device may be of the type manufactured by the Syntron Company of Homer City, Pennsylvania. It comprises a bowl 14 supported on a vibratory mechanism 16. The mechanism 16 maintains the bowl 14 in vibration so as to cause a plurality of workpieces which are placed in the bowl at random dispersion to be sequentially fed in oriented positions to an output track 18 forming a part of the bowl mechanism. It is to be understood that other types of aligning feed devices such as magazines or bowls with rotary hoppers might be employed.

The hopper 12 is filled with the terminal blocks 20 into which the machine is adapted to insert screws. These terminal blocks are rectangular in shape and have four threaded holes 22 within which the screws are to be threaded. The block 20 has four ridges 24 extending from its lower side. The bowl mechanism 12 orients the block 20 on the track 18 so that it is supported on the four ridges 24 with one pair of ridges on its forward edge and one pair of ridges on its trailing edge.

A central table 26 is supported above the base 10 by a substructure 28. The table 26 covers a major portion of the base 10 and supports four additional hoppers 30, 32, 34 and 36. The two hoppers 30 and 32 are disposed on opposed edges of the table and supply the machine with a plurality of small washers 38, which may be seen in FIGURE 4. Similarly, the hoppers 34 and 36 supply the machine with a constant source of oriented screws 40, also shown in FIGURE 4. The machine mechanism properly positions and supports the screws, washers and terminal blocks so that four screws with a washer on each one of them may be inserted into the four holes 22 of a terminal block simultaneously by a multiple spindle screw driver head, generally indicated at 42, and disclosed in detail in FIGURE 6.

The two hoppers 30 and 34 supply the washers and screws, respectively, for the two holes 22 on one side of the terminal block while the hoppers 32 and 36 supply the washers and screws for the two holes 22 on the opposite side of the terminal block. The mechanism which positions and supports the screws, washers and terminal blocks for insertion by the head 42 is symmetrical in nature, both halves being identical. Therefore, in the following description, reference will often be made only to one half of the mechanism which positions and supports the parts for insertion in two holes on one side of the terminal block, it being understood that the mechanism which operates on the other two holes is symmetrical and identical thereto. However, it should be noted that this symmetry is the result of a purposeful design and not merely an aggregation of a pair of units and is considered to constitute novel subject matter.

Figure 3B:
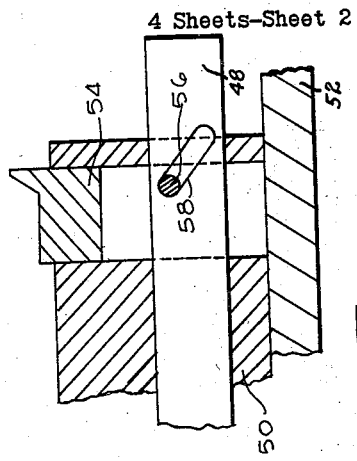
FIGURES 3A and 3B represent detailed sectional views of the workpiece shuttle feed mechanism.
Figure 3A:
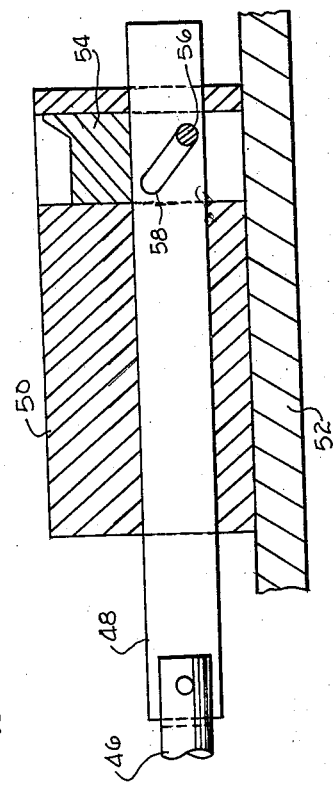

As may be seen in FIGURES 2, 3A and 3B, the terminal blocks 20 are positioned under the screw driver head 42 by a shuttle feed mechanism powered by a hydraulic cylinder 44. The cylinder is supported on the lower side of the table 26 with its rod 46 connected to a slidable cam bar 48. The cam bar 48 is slidably supported for horizontal movement within a horizontal groove in a bar 50. The bar 50 is itself supported for horizontal sliding motion along a rail 52 which forms a portion of the substructure 28.

Driving connection between cam bar 48 and the bar 50 is made through a pawl 54, which is supported for vertical sliding movement in a groove in the right end of the bar 50 as viewed in FIGURES 2 and 3. The pawl 54 has a central hole which receives the cam bar 48 and also has a horizontally extending rod 56 which connects the two opposed sides of the hole. The rod 56 passes through a slot 58 in the cam bar 48, which is inclined with respect to the horizontal. The rail 18 passes immediately over the bar 50 and it has a central aperture (not shown) through which the pawl 54 extends.

The shuttle mechanism operates in the following manner: Assuming the rod 46 of the cylinder 44 to be retracted, the bar 50 is disposed near the left edge of the rail 52, in the manner illustrated in FIGURE 2. When in this position, the slot 58 in the cam bar 48 pulls on the rod 56 so as to retain the pawl 54 in a lowered position within the bar 50 in the manner illustrated in FIGURE 3A. As the cylinder 44 extends its rod 46, the cam bar 48 first moves to the right with respect to the bar 50 so as to lift the pawl 54 through the motion of the rod 56 within the slot 58. The pawl 54 then catches the forward ridge of the terminal block 20 which is disposed on the rail 18 immediately preceding the operating position. When the rod 56 has reached the end of its travel in the slot 58, in a manner shown in FIGURE 3B, a continued extension of the cylinder rod 46 causes the entire bar 50 to move to the right. This pushes the row of terminal blocks disposed on the rail 18 so as to eject the previously completed block from the machine and move the next block into position. The vibratory hopper 12 acts to feed another terminal block into the position vacated by the block which the shuttle mechanism has moved into the active position. The rod 46 of the cylinder 44 is next retracted, first lowering the pawl 54 so it no longer contacts the terminal blocks and then moving the bar 50 to its extreme left position as in FIGURE 2 where it is situated to move the next terminal block into operating position upon the next extension of the rod 46.

Figure 4:
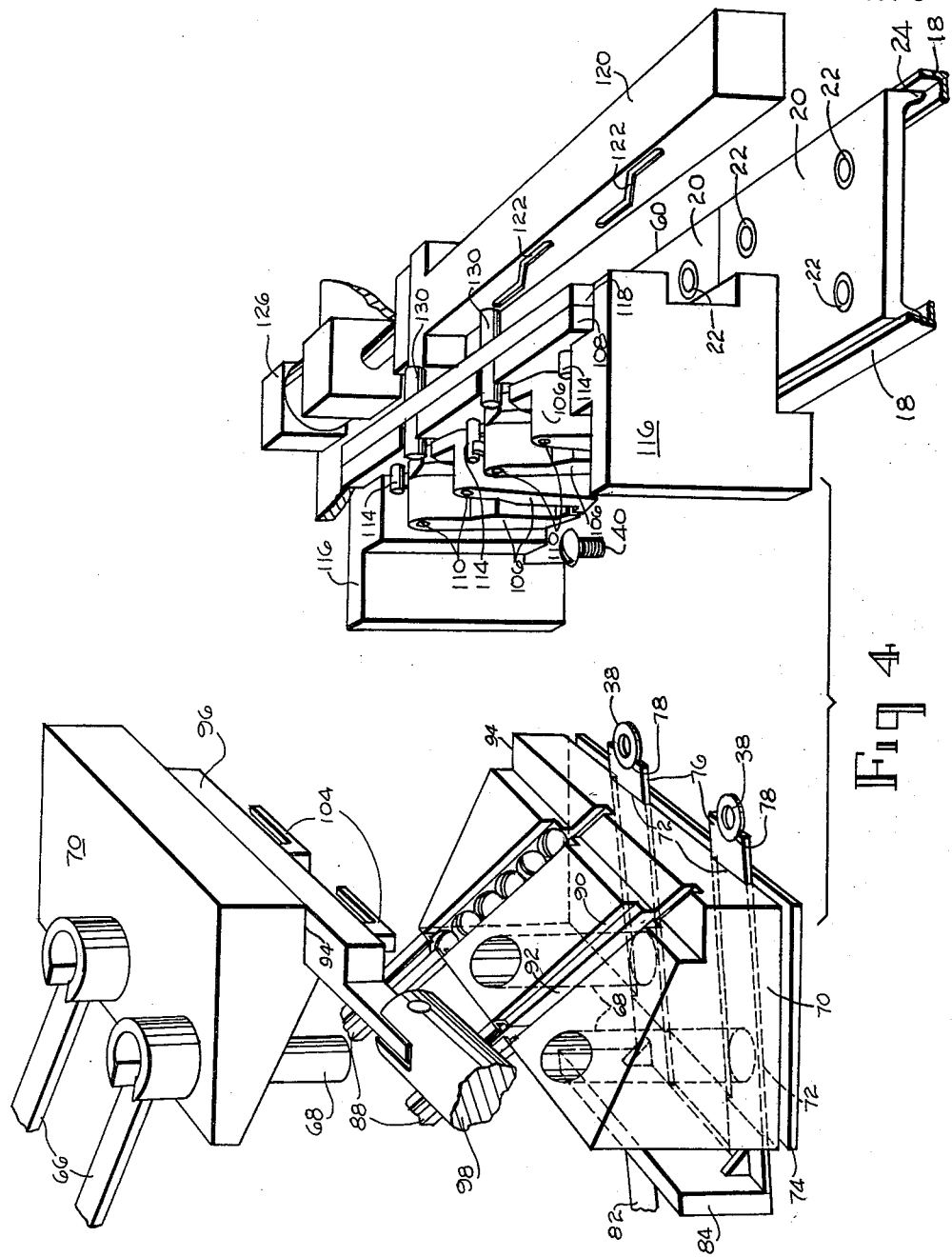
FIGURE 4 represents an exploded, perspective, detailed view of the screw and washer feeding mechanisms.

A newly positioned terminal block is disposed with respect to the machine as illustrated by the block 60 in FIGURES 2 and 4. The operating mechanism must now position a washer 38 over each hole and insert a screw 40 through each washer into the threaded hole. The mechanism which inserts the two screws and washers in the left hand holes of a terminal block which is disposed as in FIGURE 4, is shown in an exploded view in FIGURE 4. Additionally, detailed sections of a portion of the screw positioning mechanism are shown in FIGURES 5A, 5B, and 5C. The mechanism shown in FIGURE 4 is generally positioned within the block 62 in FIGURE 1. The block, generally indicated at 64, contains the mechanism for positioning the screws and washers adjacent to the two right hand holes of the terminal block, as viewed in FIGURE 4. As has been noted, this mechanism is symmetrical with that shown in block 62 and will not be described in detail.

Oriented washers from the hopper 32 enter the block 62 along two tracks 66. The tracks maintain columns of washers in two vertical circular columns 68 which are disposed within block 70, which is shown broken into two parts in the left hand side of FIGURE 4. At their lower ends, the two columns 68 terminate in generally flat horizontal slots 72 in the block 70 which are enclosed on their lower sides by a bottom plate 74. The slots 72 are slightly deeper than the thickness of the washer 38. A pair of elongated cut-off bars 76 operate within the slots 72. At their forward edges, the bars 76 have half round grooves 78 adapted to encircle the washers. The cut-off bars move longitudinally in the slots 72 under the power of a hydraulic cylinder 80, which is supported on the table 26 and may be seen in FIGURE 1. Its rod 82 connects to a vertical plate 84 which has the cut-off bars 76 attached to its lower forward edge. A similar cylinder 86 serves the analogous function for the block 64 which represents the other symmetrical half of the screw and washer positioning mechanism.

When the cylinder 80 retracts its rod 82, the cut-off bars 76 are withdrawn from the slots 72 to a point behind the columns 68. Then the washers within the columns fall under the force of gravity to place a washer within each of the slots 72. The cylinder 80 then extends its rod moving the cut-off bars through the slots 72 and pushing forward these washers. The cut-off bars are slightly thinner than a washer and move in the lower edges of the slot so as to avoid contact with the upper washers in the column. When the cut-off bars 76 are at the extreme forward end of the travel, the two washers which they have pushed are positioned immediately above a pair of holes in the terminal block 60.

The screws 40 are fed to the section 62 from the hopper 36 along a pair of tracks 88. The tracks 88 support the screws by their heads so that their threaded portions hang out through the tracks. The tracks terminate in a pair of slots 90 in the lower half of block 70 which support the screws in a similar fashion with their threaded portions hanging through a central gap 92. The slots 90 are inclined with respect to the horizontal so that the hopper 36 maintains a continuous line of screws through both of the slots 90.

At their lower forward edges, the slots 90 terminate in a groove 94 in the block 70. This groove is formed in both the upper and lower halves of the block as shown in FIGURE 4 and a slide bar 96 is powered to move horizontally within the groove. Bar 96 is actuated by rod 98 as powered through a hydraulic cylinder 100 as shown in FIGURE 1. The cylinder 100 powers a reciprocating bar 102 for performing a function similar to rod 98 in the other symmetrical half of the screw and washer positioning mechanism.

The bar 96 has two arms 104 extending from its lower end. Each arm comprises a short vertical section and an elongated horizontal section. The horizontal section is adapted to fit across the lower ends of the slots 90 to stop the screws at that point. As the rod 98 is withdrawn momentarily, a single screw is allowed to feed through each of the tracks 88. These screws fall into the jaws of a screw positioning mechanism illustrated in the right hand section of FIGURE 4 and in FIGURES 5A, 5B and 5C.

Each screw is retained by a pair of jaws 106. Two pairs of jaws, one pair for each screw that the section handles, are pivotably supported on a plate 108 by pins 110. A pin supports each jaw near its upper end so that its lower end is free to move in arcuate paths about the pin. The lower ends of the jaws 106 are urged toward one another by flat springs 112 which attach to each jaw near its lower end and connect at their other ends to horizontal pins 114 affixed on the block 108. The outside jaw in each pair has its own pin 114 while the two jaw halves which are adjacent to one another share a center pin.

At its edge, the plate 108 is retained in a track formed by side plates 116 and a backing plate 118. The plate 108 is free to move vertically within this groove and it does so under the influence of a cam bar 120 which has a pair of cam grooves 122 that engage a pair of horizontal studs 124 which project from the rear side of the plate 108, as viewed in FIGURE 5. The cam slots 122 have an inclined center section and two horizontal end sections. The cam rod 120 also has two slots on its hidden side which are similar to slots 122 and which perform the equivalent function in the other symmetrical half of the screw positioning apparatus.

FIGURES 5A and 5B illustrate the vertical motion of the bar 108 under the influence of the cam bar 120. The cam bar 120 is powered by hydraulic cylinder 126 which is disposed on the table 26. In FIGURE 5A, the position of the plate 108 is shown when the rod of the cylinder 126 is retracted. The pins 124 then rest in the upper sections of the slots 122 and the plate 108 is raised with respect to the end sections 116 and the back plate 118. In FIGURE 5B the cylinder 126 has extended its rod causing the cam slots 122 to lower the pins 124 and bringing the plate 108 into alignment with the backing plate 118 as is shown in FIGURE 4.

The plate 118 supports a pair of horizontally extending pins 130 which project into grooves 132 in the top of plate 108 above the centerline of each jaw pair. When the plate 108 is in a raised position, these pins 130 abut the corners of the jaws 106 as may be seen in FIGURE 5A and cause the lower ends of the jaws to separate. This is the position which the jaws are in when the cylinder 100 is retracted so as to allow a pair of screws to fall from the lower ends of the slots 90. The screws then fall into the jaws 106 which are opened sufficiently at their lower ends to accommodate the threaded portion of the screws. The heads of the screws rest on the top of these sections as may be seen in FIGURE 5B. The cylinder 126 next extends its rod so as to lower the plate 108 and thereby eliminate the action of the pins 130 to open the jaws. The jaws then close firmly about the screws under the influence of the springs 112. This action also lowers each of the screws through a washer 38 which has been positioned beneath it by the cut-off bars 76. The screws and washers are then in an appropriate position to be rotated into locked engagement with the holes 22 by the screw driver spindles 42.

The screw driver spindle head 42 is illustrated in detail in FIGURE 6. It is supported above the table 26 on a vertical member 140 which has a perpendicular extension 142 which retains the screw driver spindle. At the top of the member 140, a plate 144 supports an electric motor 146 which has its output shaft connected by a belt 148 to the input of a speed reducer 150. The reducer drives the screw driver spindles through its output shaft 152. This shaft is keyed so that the spindle 42 may move vertically and still retain its driving connection with the shaft 152.

As may be seen in FIGURE 6, the lower end of the rod 152, which is vertically movable, is retained within a cylinder 154 by a pair of bearings 156 and 158 at its upper and lower ends. The lower end of the rod 152 terminates in a gear 160 which is in mesh with four spur gears 162 (only two shown). These gears 162 each drive one of four shafts 164 which have screw driver heads 166 on their lower ends. Shoulders 168 on the heads are used in connection with releasing the screws from the jaws 106 as will be subsequently described. The shafts 164 are retained within cylinders 170 by sets of needle bearings 172 near their upper and lower ends.

The assembly comprising the cylinder 154 and the cylinders 170 is vertically movable with respect to a fixed outer housing 174 making sliding contact with the housing by means of a fabric O ring 176 which is fixed in a groove in the outer housing 174. At its lower end, the cylinder 154 has a flanged section which contains an O ring 178. This flanged section 180 acts as a piston which is movable within the outer cylinder 174.

Hydraulic fluid under pressure may be introduced to the upper side of the flanged section 180 through hydraulic connection 182 to cause the screw driver assembly to be lowered within the cylinder 174. Similarly, hydraulic fluid may be admitted on the lower side of the section 180 through a hydraulic fitting 184 and associated fluid ducts 186 in order to raise the screw drivers within the assembly 174. The keyed section of the shaft 152 allows the screw drivers to continue to rotate while in a raised or lowered position.

FIGURE 5C illustrates the manner in which the screw drivers 166 drive the screws and release them from the jaws. With the screws in the position illustrated in FIGURE 5B, hydraulic fluid is admitted to the passage 182 to cause the screw drivers 164 to be lowered within the cylinder 174 to bring one into contact with each pair of jaws 106. The cam surfaces 168 on the heads of the screw drivers make contact with the shoulders on each of the jaws 106 which forces them to open against the force of the springs 112. This allows the screw driver 166 to engage the slots of the screws 40 and rotate them into threaded contact with the holes 22 in the electrical connector block without catching the jaws between the screw heads and the washers.

When the screws are completely rotated into position, the hydraulic pressure is switched from the passage 182 to the passage 184 by automatic hydraulic valves, raising the screw driver heads 166. The hydraulic cylinder 126 then retracts its rod and brings the jaws into the position shown in FIGURE 5A wherein they are positioned with respect to the slot 94 in the block 70 to receive another set of screws upon motion of the bar 96.

The motions of the various hydraulic cylinders in the spindle head occur in the proper sequence as controlled by limit switches, which are not shown, but which are disposed in positions which will be obvious to those skilled in the art of automatic machine control.

Having thus described my invention, I claim:

1. A device for receiving screws and for positioning them for an automatic screwing operation, comprising: a support member; a pair of jaws each pivotably fixed with respect to said support member; spring means for urging said jaws toward one another; means for vertically moving said support member; an abutment adapted to engage said jaws when said support member is at the upper end of its travel in order to spread said jaws from one another sufficiently to retain a screw; and a screw driving head having means thereon for separating said jaws more completely than said abutment so as to allow a screw to be passed through said jaws, whereby said jaws have three positions of operation, a first, intermediate position wherein they are adapted to receive a screw, a second, closed position wherein they are adapted to retain a screw and position it with respect to a workpiece upon movement of said support member, and a third, open position wherein they are adapted to allow a screw head to pass through following its insertion into a threaded member.

2. A device for fastening threaded members, comprising: means for supplying a plurality of oriented male threaded members; a pair of jaws normally urged toward one another, being operative to move vertically, and having a first position of closure wherein they are adapted to receive a threaded member, a second position of closure wherein they are adapted to firmly grasp a threaded member, and a third position of closure wherein they are adapted to clear a threaded member head; means for feeding a single threaded member at a time from said supply means to said jaws in their first position; means for shifting said jaws from said first position to said second position and to simultaneously lower said jaws; and a threaded member driving head operative to rotate a threaded member retained in said jaws and to simultaneously shift said jaws to said third position.

3. A device for fastening threaded members, comprising: a pair of pivotable jaws normally urged toward one another and movable vertically; means for supplying a plurality of male threaded members; first power means for selecting a single male threaded member and disposing it between said jaws; second power means for maintaining said jaws in an open position to receive said threaded member, and for vertically moving said jaws and simultaneously allowing said jaws to close about said threaded member; and a screw driver head adapted for vertical movement and operative to rotate said threaded member and to shift said jaws to an open position whereby the head of said threaded member may be passed through said jaws.

4. A device for inserting screws into female threaded openings, comprising: means for supplying a sequence of screws in oriented position; a pair of jaws each pivotably supported on a jaw support plate and resiliently urged into a closed position; means for shifting said jaw support plate in a vertical direction; an abutment operative to spread said jaws when said jaw support plate is at the upper end of its travel sufficiently to receive a screw member and to retain it by supporting the under sides of its head; a selective feed device for providing a single screw at a time to said jaws when they are in a position opened by said abutment; and a screw driver member having means for engaging and rotating a screw by its head and for opening said jaws to such a position that the screw head may pass through them.

References Cited in the file of this patent

UNITED STATES PATENTS

| | | |
|---|---|---|
| 194,103 | Munson | Aug. 14, 1877 |
| 1,996,368 | Drissner | Apr. 2, 1935 |
| 2,055,199 | Hoffman | Sept. 22, 1936 |
| 2,261,134 | Blair | Nov. 4, 1941 |
| 2,373,992 | Billinghurst | Apr. 17, 1945 |
| 2,554,732 | Doyle | May 29, 1951 |
| 2,625,967 | Stull | Jan. 20, 1953 |
| 2,664,121 | Travis | Dec. 29, 1953 |
| 2,770,269 | Austin | Nov. 13, 1956 |
| 2,787,303 | Coder et al. | Apr. 2, 1957 |
| 2,803,274 | Zubal et al. | Aug. 20, 1957 |
| 2,806,494 | Kull | Sept. 17, 1957 |
| 2,843,166 | Van Alstyne | July 15, 1958 |
| 2,870,805 | Zakrzewski et al. | Jan. 27, 1959 |